United States Patent
Welingkar et al.

(10) Patent No.: US 8,812,614 B2
(45) Date of Patent: Aug. 19, 2014

(54) DATA BACKUP FOR A MOBILE COMPUTING DEVICE

(75) Inventors: Bharat Welingkar, Los Altos, CA (US); Jiji Nair, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 998 days.

(21) Appl. No.: 12/134,154

(22) Filed: Jun. 5, 2008

(65) Prior Publication Data
US 2009/0307284 A1    Dec. 10, 2009

(51) Int. Cl.
*G06F 15/16* (2006.01)

(52) U.S. Cl.
USPC ............ 709/217; 709/218; 709/219; 707/640

(58) Field of Classification Search
USPC ............................ 709/217, 218, 219; 707/640
See application file for complete search history.

(56) References Cited

U.S. PATENT DOCUMENTS

| | | | |
|---|---|---|---|
| 5,710,922 A | 1/1998 | Alley et al. | |
| 5,727,202 A | 3/1998 | Kucala | |
| 6,324,544 B1 | 11/2001 | Alam et al. | |
| 6,434,683 B1* | 8/2002 | West et al. | 711/162 |
| 6,549,917 B1 | 4/2003 | Pollard et al. | |
| 6,636,873 B1 | 10/2003 | Carini et al. | |
| 6,671,757 B1 | 12/2003 | Multer et al. | |
| 6,862,617 B1 | 3/2005 | Wu | |
| 6,868,451 B1 | 3/2005 | Peacock | |
| 6,975,854 B1 | 12/2005 | Kee | |
| 7,107,043 B2 | 9/2006 | Aoyama | |
| 7,516,357 B2 | 4/2009 | Shen et al. | |
| 2002/0059299 A1* | 5/2002 | Spaey | 707/104.1 |
| 2004/0205110 A1* | 10/2004 | Hinshaw | 709/201 |
| 2005/0039069 A1* | 2/2005 | Prahlad et al. | 714/2 |
| 2005/0050117 A1* | 3/2005 | Seo et al. | 707/204 |
| 2005/0102329 A1 | 5/2005 | Jiang et al. | |
| 2005/0131990 A1* | 6/2005 | Jewell | 709/201 |
| 2005/0191998 A1* | 9/2005 | Onyon et al. | 455/419 |
| 2006/0112303 A1* | 5/2006 | Levy | 714/6 |
| 2007/0168721 A1 | 7/2007 | Luiro et al. | |
| 2007/0197202 A1 | 8/2007 | Sprigg et al. | |
| 2008/0235299 A1* | 9/2008 | Haselton et al. | 707/204 |
| 2008/0310633 A1 | 12/2008 | Brown et al. | |
| 2009/0019492 A1* | 1/2009 | Grasset | 725/45 |
| 2009/0041230 A1 | 2/2009 | Williams | |
| 2009/0075630 A1 | 3/2009 | McLean | |
| 2009/0163175 A1* | 6/2009 | Shi et al. | 455/411 |
| 2009/0307333 A1 | 12/2009 | Welingkar et al. | |

OTHER PUBLICATIONS

U.S. Appl. No. 12/134,156, filed Jun. 5, 2008, Welingkar et al.
U.S. Appl. No. 11/835,628, filed Aug. 8, 2007, Williams.

(Continued)

*Primary Examiner* — Harunur Rashid
(74) *Attorney, Agent, or Firm* — Mahamedi Paradice LLP

(57) ABSTRACT

A system and method of backing up a data file from a mobile computing device is disclosed. The method can include receiving a data file from the mobile computing device at a server computer and storing the data file on a storage device. The method can include receiving data indicative of changes made to the data file on the mobile computing device. The method can further include changing the data file stored on the storage device based on the data indicative of changes made to the data file on the mobile computing device.

19 Claims, 8 Drawing Sheets

(56) References Cited

OTHER PUBLICATIONS

Block (data storage), Wikipedia, printed on Mar. 3, 2008 from Internet address: http://en.wikipedia.org/wiki/Block_%28data_storage%29, 1 page.
Synchronization, Wikipedia, printed on Mar. 3, 2008 from Internet address: http://en.wikipedia.org/wiki/Synchronization, 4 pages.
Amazon S3, Wikipedia, printed on Mar. 3, 2008 from Internet address: http://en.wikipedia.org/wiki/Amazon_S3, 4 pages.
Relational database, Wikipedia, printed on Mar. 3, 2008 from Internet address: http://en.wikipedia.org/wiki/Relational_database, 5 pages.
SQL, Wikipedia, printed on Mar. 3, 2008 from Internet address: http://en.wikipedia.org wiki/SQL, 10 pages.
SyncML, Wikipedia, printed on Mar. 3, 2008 from Internet address: http://en.wikipedia.org/wiki/SyncML, 5 pages.
Computer file, Wikipedia, printed on Mar. 3, 2008 from Internet address: http://en.wikipedia.org/wiki/Computer_file, 6 pages.
Backup, Wikipedia, printed on Mar. 3, 2008 from Internet address: http://en.wikipedia.org/wiki/Backup, 12 pages.
System Restore, Wikipedia, printed on Mar. 13, 2008 from Internet address: http://en.wikipedia.org/wiki/System_restore, 1 page.
System Restore, Wikipedia, printed on Mar. 3, 2008 from Internet address: http://en.wikipedia.org/wiki/System_Restore, 3 pages.
Time Machine (Apple Software), Wikipediea, printed on Mar. 3, 2008 from Internet address: http://en.wikipedia.org/wiki/Time_Machine_%28Apple_software%29, 2 pages.
US Office Action for U.S. Appl. No. 11/712,228, mail date Dec. 11, 2009, 12 pages.
US Office Action for U.S. Appl. No. 11/712,228, mail date Jun. 18, 2009, 12 pages.
US Office Action for U.S. Appl. No. 11/712,228, mail date Apr. 13, 2009, 14 pages.
US Office Action for U.S. Appl. No. 12/134,156, mail date Mar. 24, 2010, 14 pages.

* cited by examiner

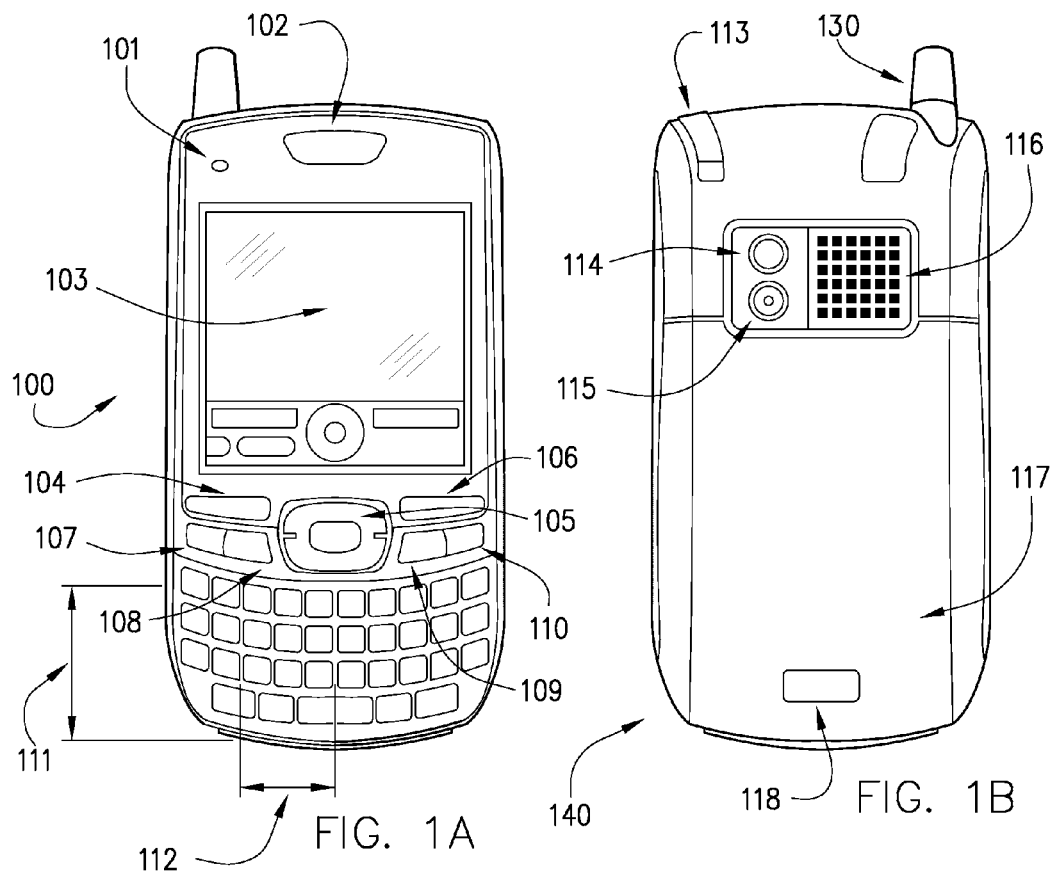
FIG. 1A
FIG. 1B
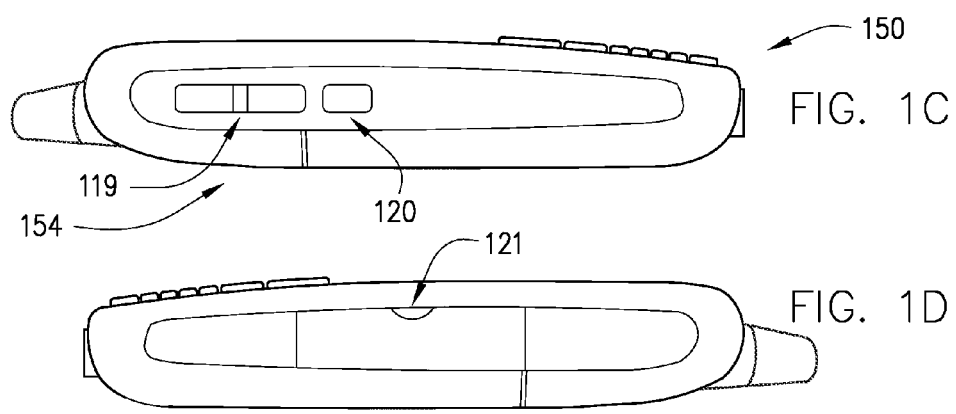
FIG. 1C
FIG. 1D
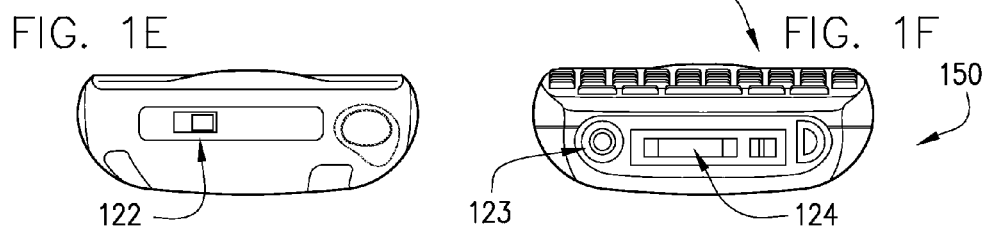
FIG. 1E
FIG. 1F

DATA BACKUP FOR A MOBILE COMPUTING DEVICE

BACKGROUND

Users of mobile computing devices, such as mobile phones, smartphones, and personal digital assistants, store various types of data on the devices. Contact information, calendar appointments, and web browser favorites may all be stored on mobile computing devices. This data is also updated from time to time by a user or other data sources with new data.

Data backup systems allow data from one computing device to be backed up to a secondary memory device, such as a portable hard drive, server computer, digital versatile disc, or other memory device. The backed-up data can then be restored to the same device in the event of data loss or to a new computing device in the case of the user acquiring a replacement or upgraded device.

BRIEF DESCRIPTION OF THE DRAWINGS

FIGS. 1A through 1F illustrate a mobile computing device from various views, according to an exemplary embodiment;

DETAILED DESCRIPTION OF THE EXEMPLARY EMBODIMENTS

Figure 2:
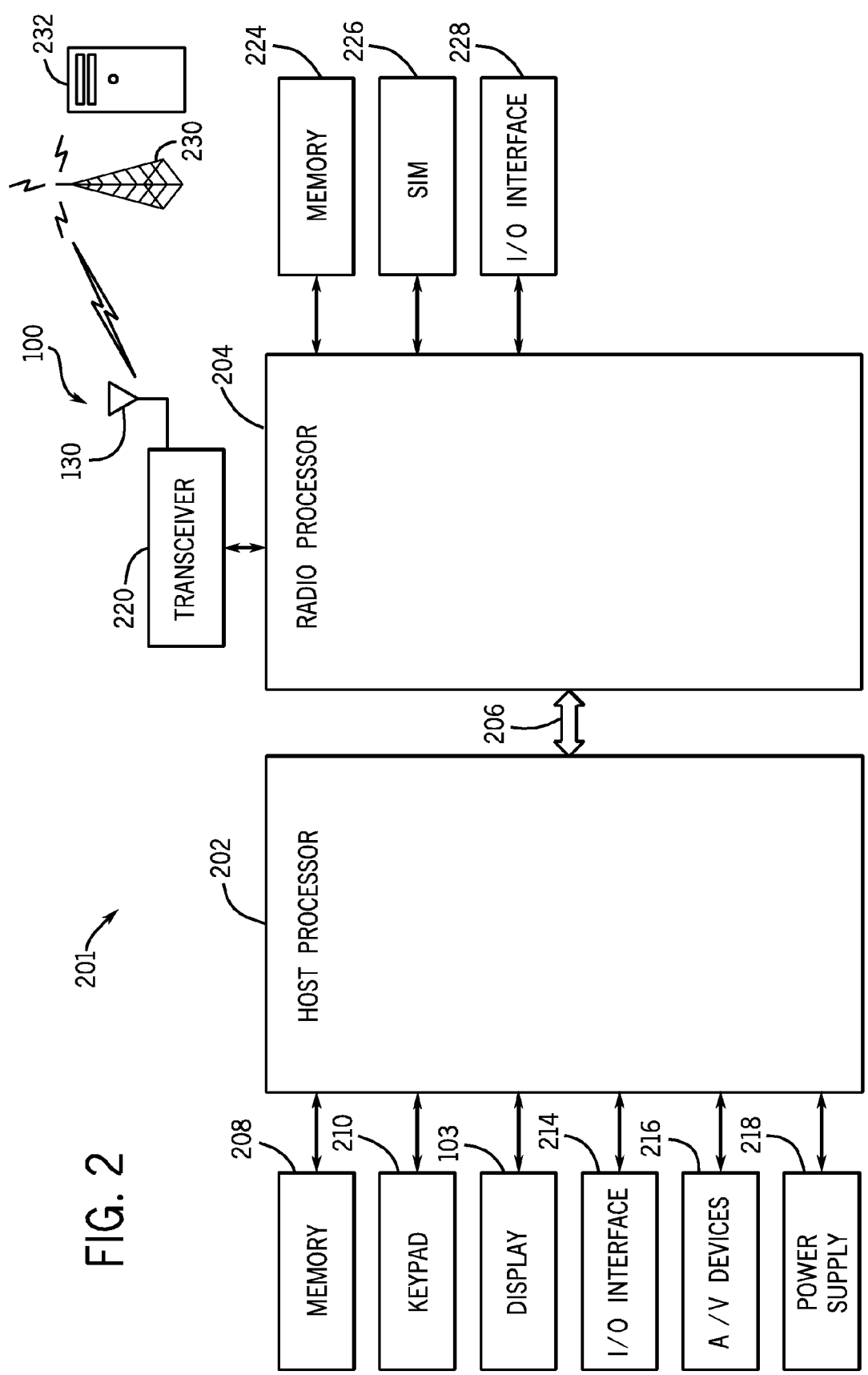
FIG. 2 is a block diagram of the mobile computing device of FIGS. 1A through 1F, according to an exemplary embodiment.

Described herein are various exemplary embodiments of systems and methods for backing up data from a mobile computing device. Some embodiments may reduce the amount of data and/or the number of backup data files being stored at a server, which makes the embodiments more scalable for backing up large numbers of devices and reduces the use of network bandwidth to backup the data. Some embodiments may reduce the amount of data being transmitted from the mobile computing device to the server. Some embodiments may reduce the number of restore cycles needed to restore a backed-up data file to a mobile computing device, which may also reduce power consumption on the mobile computing device. Some embodiment minimize interference or blocking of the user's use of the mobile computing device by scheduling backup transmissions during predetermined times of the day and by minimizing the quantity of data being backed up.

The teachings herein extend to those embodiments that fall within the scope of the appended claims, regardless of whether they accomplish one or more of the above-mentioned exemplary advantages.

Referring to FIGS. 1A through 1F, a mobile computing device 100 is shown from various angles, according to an exemplary embodiment. FIG. 1A is a front view of device 100; FIG. 1B is a rear view of device 100; FIGS. 1C and 1D are side views of device 100; and FIGS. 1E and 1F are top and bottom views of device 100. The device may be any type of communications or computing device (e.g., a cellular phone, other mobile device, digital media player (e.g., audio or audio/video), personal digital assistant, etc.).

Device 100 may be a smart phone, which is a combination mobile telephone and handheld computer having personal digital assistant ("PDA") functionality. The teachings herein can be applied to other mobile computing devices (e.g., a laptop computer) or other electronic devices (e.g., a desktop personal computer, etc.). PDA functionality can comprise one or more of personal information management, database functions, word processing, spreadsheets, voice memo recording, location-based services, device backup and lock, media playing, internet browsing, etc. and is configured to synchronize personal information or user data (e.g., contacts, e-mail, calendar, notes, to-do list, web browser favorites, etc.) from one or more applications with a computer (e.g., desktop, laptop, server, etc.). Device 100 is further configured to receive and operate additional applications provided to device 100 after manufacture, e.g., via wired or wireless download, Secure Digital card, etc.

Device 100 may be a handheld computer (e.g., a computer small enough to be carried in a typical front pocket found in a pair of pants or other similar pocket), comprising such devices as typical mobile telephones and PDAs, but the term "handheld" and the phrase "configured to be held in a hand during use" excluding typical laptop computers and tablet personal computers ("PCs") for purposes of this disclosure. In alternative embodiments, the teachings herein may extend to laptop computers, tablet PCs, desktop PCS, and other electronic devices. The various input devices and other parts of device 100 as described below may be positioned anywhere on device 100 (e.g., the front side of FIG. 1A, the rear side of FIG. 1B, the sides of FIGS. 1C and 1D, etc.).

Device 100 includes various user input devices therein. For example, the user input devices may include a send button 104 usable to select options appearing on display 103 and/or send messages, a 5-way navigator 105 usable to navigate through options appearing on display 103, a power/end button 106 usable to select options appearing on display 103 and to turn on display 103, a phone button 107 usable to access a phone application screen, a calendar button 108 usable to access a calendar application screen, a messaging button 109 usable to access a messaging application screen (e.g., e-mail, text, Multimedia Messaging Service (MMS), etc.), an applications button 110 usable to access a screen showing available applications, a thumb keyboard 111 (which includes a phone dial pad 112 usable to dial during a phone application), a volume button 119 usable to adjust the volume of audio output of device 100, a customizable button 120 which a user may customize to perform various functions, a ringer switch 122 usable to switch the device from one mode to another mode (such as switching from a normal ringer mode to a meeting ringer mode), and a touch screen display 103 usable to select control options displayed on display 103.

Device 100 also includes various audio circuits. The audio circuits may include phone speaker 102 usable to listen to information in a normal phone mode, external speaker 116 louder than the phone speaker (e.g. for listening to music, for a speakerphone mode, etc.), headset jack 123 to which a user can attach an external headset which may include a speaker and/or a microphone, and a microphone that can be used to pick up audio information such as the user's end of a conversation during a phone call.

Device 100 may also include a status indicator 101 that can be used to indicate the status of device 100 (such as messages pending, charging, low battery, etc.), a stylus slot 113 for receiving a stylus usable to input data on touch screen display 103, a digital camera 115 usable to capture images, a mirror 114 positioned proximate camera 115 such that a user may view themselves in mirror 114 when taking a picture of themselves using camera 115, a removable battery 118, and a connector 124 which can be used to connect device 100 to either (or both) an external power supply such as a wall outlet or battery charger or an external device such as a personal computer, a global positioning system ("GPS") unit, a display unit, or some other external device.

Device 100 may also include an expansion slot 121 that may be used to receive a memory card and/or a device which communicates data through slot 121, and a Subscriber Identity Module (SIM) card slot 117, located behind battery 118, configured to receive a SIM card or other card that allows the user to access a cellular network.

In various embodiments device 100 may include a housing 140. Housing 140 may be configured to retain or secure a screen in a fixed relationship above a plurality of user input devices in a substantially parallel or same plane. A fixed relationship may exclude a hinged or movable relationship between the screen and plurality of keys in the fixed embodiment, though hinged or movable relationships may be used in other embodiments.

Housing 140 could be any size, shape, and dimension. In some embodiments, housing 140 has a width 152 (shorter dimension) of no more than about 200 mm or no more than about 100 mm. According to some of these embodiments, housing 140 has a width 152 of no more than about 85 mm or no more than about 65 mm. According to some embodiments, housing 140 has a width 152 of at least about 30 mm or at least about 50 mm. According to some of these embodiments, housing 140 has a width 152 of at least about 55 mm.

In some embodiments, housing 140 has a length 154 (longer dimension) of no more than about 200 mm or no more than about 150 mm. According to some of these embodiments, housing 140 has a length 154 of no more than about 135 mm or no more than about 125 mm. According to some embodiments, housing 140 has a length 154 of at least about 70 mm or at least about 100 mm. According to some of these embodiments, housing 140 has a length 154 of at least about 110 mm.

In some embodiments, housing 140 has a thickness 150 (smallest dimension) of no more than about 150 mm or no more than about 50 mm. According to some of these embodiments, housing 140 has a thickness 150 of no more than about 30 mm or no more than about 25 mm. According to some embodiments, housing 140 has a thickness 150 of at least about 10 mm or at least about 15 mm. According to some of these embodiments, housing 140 has a thickness 150 of at least about 50 mm. According to some embodiments, housing 140 has a thickness 150 of 11 mm or less.

In some embodiments, housing 140 has a volume of up to about 2500 cubic centimeters and/or up to about 1500 cubic centimeters. In some of these embodiments, housing 140 has a volume of up to about 1000 cubic centimeters and/or up to about 600 cubic centimeters.

Device 100 may include an antenna 130 system for transmitting and/or receiving radio frequency signals. Each transceiver of device 100 may include individual antennas or may include a common antenna 130. The antenna system may include or be implemented as one or more internal antennas and/or external antennas.

While described with regards to a handheld device, many embodiments are usable with portable devices which are not handheld and/or with non-portable devices/systems.

Device 100 may provide voice communications functionality in accordance with different types of cellular radiotelephone systems. Examples of cellular radiotelephone systems may include Code Division Multiple Access ("CDMA") cellular radiotelephone communication systems, Global System for Mobile Communications ("GSM") cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service ("GPRS") systems ("GSM/GPRS"), CDMA/1xRTT (1 times Radio Transmission Technology) systems, Enhanced Data Rates for Global Evolution ("EDGE") systems, Evolution Data Only or Evolution Data Optimized ("EV-DO") systems, etc.

Device 100 may be configured to provide voice and/or data communications functionality through wireless access points ("WAPs") in accordance with different types of wireless network systems. A wireless access point may comprise any one or more components of a wireless site used by device 100 to create a wireless network system that connects to a wired infrastructure, such as a wireless transceiver, cell tower, base station, router, cables, servers, or other components depending on the system architecture. Examples of wireless network systems may further include a wireless local area network ("WLAN") system, wireless metropolitan area network ("WMAN") system, wireless wide area network ("WWAN") system (e.g., a cellular network), and so forth. Examples of suitable wireless network systems offering data communication services may include the Institute of Electrical and Electronics Engineers ("IEEE") 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, a wireless personal area network ("PAN") system, such as a Bluetooth® system operating in accordance with the Bluetooth Special Interest Group ("SIG") series of protocols.

As shown in the embodiment of FIG. 2, device 100 comprises a processing circuit 201, which may comprise a dual processor architecture, including a host processor 202 and a radio processor 204 (e.g., a base band processor or modem). Host processor 202 and radio processor 204 may be configured to communicate with each other using an interface 206 such as one or more universal serial bus ("USB") interfaces, micro-USB interfaces, universal asynchronous receiver-transmitter ("UART") interfaces, general purpose input/output ("GPIO") interfaces, control/status lines, control/data lines, shared memory, and so forth.

Host processor 202 may be configured to execute various computer programs (e.g., software, firmware, or other code) such as application programs and system programs to provide computing and processing operations for device 100. Radio processor 204 may be responsible for performing various voice and data communications operations for device 100 such as transmitting and receiving voice and data information over one or more wireless communications channels. Although embodiments of the dual processor architecture may be described as comprising host processor 202 and radio processor 204 for purposes of illustration, the dual processor architecture of device 100 may comprise one processor, more than two processors, may be implemented as a dual- or multi-core chip with both host processor 202 and radio processor 204 on a single chip, etc. Alternatively, a single processor or multiple processors may perform the functions of host processor 202 and radio processor 204, such as a single, unified processor that handles host and radio functions, or other multiprocessor topologies which do not rely on the concept of a host. Alternatively, processing circuit 201 may comprise any digital and/or analog circuit elements, comprising discrete and/or solid state components, suitable for use with the embodiments disclosed herein.

In various embodiments, host processor 202 may be implemented as a host central processing unit ("CPU") using any suitable processor or logic device, such as a general purpose processor. Host processor 202 may comprise, or be implemented as, a chip multiprocessor ("CMP"), dedicated processor, embedded processor, media processor, input/output ("I/O") processor, co-processor, field programmable gate array ("FPGA"), programmable logic device ("PLD"), or other processing device in alternative embodiments.

Host processor 202 may be configured to provide processing or computing resources to device 100. For example, host processor 202 may be responsible for executing various computer programs such as application programs and system programs to provide computing and processing operations for device 100. Examples of application programs may include, for example, a telephone application, voicemail application, e-mail application, instant message ("IM") application, short message service ("SMS") application, multimedia message service ("MMS") application, web browser application, personal information manager ("PIM") application (e.g., contact management application, calendar application, scheduling application, task management application, web site favorites or bookmarks, notes application, etc.), word processing application, spreadsheet application, database application, video player application, audio player application, multimedia player application, digital camera application, video camera application, media management application, a gaming application, and so forth. The application software may provide a graphical user interface ("GUI") to communicate information between device 100 and a user. The computer programs may be stored as firmware on a memory associated with processor 202, may be loaded by a manufacturer during a process of manufacturing device 100, and may be updated from time to time via wired or wireless communication.

System programs assist in the running of a computer system. System programs may be directly responsible for controlling, integrating, and managing the individual hardware components of the computer system. Examples of system programs may include, for example, an operating system ("OS"), a kernel, device drivers, programming tools, utility programs, software libraries, an application programming interface ("API"), a GUI, and so forth. Device 100 may utilize any suitable OS in accordance with the described embodiments such as a Palm OS®, Palm OS® Cobalt, Microsoft Windows® OS, Microsoft Windows® CE, Microsoft Pocket PC, Microsoft Mobile, Symbian OS™ Embedix OS, any Linux distribution, Binary Run-time Environment for Wireless ("BREW") OS, JavaOS, a Wireless Application Protocol ("WAP") OS, and so forth.

Device 100 may comprise a memory 208 coupled to host processor 202. In various embodiments, memory 208 may be configured to store one or more computer programs to be executed by host processor 202. Memory 208 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory ("RAM"), dynamic RAM ("DRAM"), Double-Data-Rate DRAM ("DDRAM"), synchronous DRAM ("SDRAM)", static RAM ("SRAM"), read-only memory ("ROM"), programmable ROM ("PROM"), erasable programmable ROM ("EPROM"), electrically erasable programmable ROM ("EEPROM"), flash memory (e.g., NOR or NAND flash memory), or any other type of media suitable for storing information.

Although memory 208 is shown as being separate from host processor 202 for purposes of illustration, in various embodiments some portion or the entire memory 208 may be included on the same integrated circuit as host processor 202. Alternatively, some portion or the entire memory 208 may be disposed on an integrated circuit or other medium (e.g., hard disk drive) external to the integrated circuit of host processor 202. In various embodiments, device 100 may comprise a memory port or expansion slot 121 (shown in FIG. 1) to support a multimedia and/or memory card, for example. Processing circuit 201 may use memory port or expansion slot 121 to read and/or write to a removable memory card having memory, for example, to determine whether a memory card is present in port or slot 121, to determine an amount of available memory on the memory card, to store subscribed content or other data or files on the memory card, etc.

Device 100 may comprise a user input device 210 coupled to the host processor 202. User input device 210 may comprise, for example, a alphanumeric, numeric or QWERTY key layout and an integrated number dial pad. Device 100 also may comprise various keys, buttons, and switches such as, for example, input keys, preset and programmable hot keys, left and right action buttons, a navigation button such as a multi-directional navigation button, phone/send and power/end buttons, preset and programmable shortcut buttons, a volume rocker switch, a ringer on/off switch having a vibrate mode, a keypad and so forth. Examples of such objects are shown in FIG. 1 as 5-way navigator 105, power/end button 106, phone button 107, calendar button 108, messaging button 109, applications button 110, thumb keyboard 111, volume button 119, customizable button 120, and ringer switch 122.

The host processor 202 may be coupled to display 103. Display 103 may comprise any suitable visual interface for displaying content to a user of device 100. For example, display 103 may be implemented by a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

Device 100 may comprise an I/O interface 214 coupled to the host processor 202. I/O interface 214 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a PC, or a remote computer system, such as a computer server. In various implementations, device 100 may be configured to transfer and/or synchronize information with the local computer system, such as personal information management data stored in one or more databases in memory 208.

Host processor 202 may be coupled to various audio/video ("A/V") devices 216 that support A/V capability of device 100. Examples of A/V devices 216 may include, for example, a microphone, one or more speakers, an audio port to connect an audio headset, an audio coder/decoder (codec), an audio player, a digital camera, a video camera, a video codec, a video player, and so forth.

Host processor 202 may be coupled to a power supply 218 configured to supply and manage power to the elements of device 100. In various exemplary embodiments, power supply 218 may be implemented by a rechargeable battery, such as a removable and rechargeable lithium ion battery to provide direct current ("DC") power, and/or an alternating current ("AC") adapter to draw power from a standard AC main power supply.

As mentioned above, radio processor 204 may perform voice and/or data communication operations for device 100. For example, radio processor 204 may be configured to communicate voice information and/or data information over one or more assigned frequency bands of a wireless communication channel. Radio processor 204 may be implemented as a communications processor using any suitable processor or logic device, such as a modem processor or baseband processor. Radio processor 204 may comprise, or be implemented as, a digital signal processor ("DSP"), a media access control ("MAC") processor, or any other type of communications processor in accordance with the described embodiments. Radio processor 204 may be any of a plurality of modems manufactured by Qualcomm, Inc. or other manufacturers.

Device 100 may comprise a transceiver 220 coupled to radio processor 204. Transceiver 220 may comprise one or more transceivers configured to communicate using different types of protocols, communication ranges, operating power requirements, RF sub-bands, information types (e.g., voice or data), use scenarios, applications, and so forth. For example, transceiver 220 may comprise a Wi-Fi transceiver and a cellular or WAN transceiver configured to operate simultaneously.

Transceiver 220 may be implemented using one or more chips as desired for a given implementation. Although transceiver 220 is shown as being separate from and external to radio processor 204 for purposes of illustration, in various embodiments some portion or the entire transceiver 220 may be included on the same integrated circuit as radio processor 204.

Device 100 may comprise an antenna or antenna system 130 for transmitting and/or receiving electrical signals. As shown, antenna system 130 may be coupled to radio processor 204 through transceiver 220. Radio tower 230 and server 232 are shown as examples of potential objects configured to receive a signal from antenna system 130.

Device 100 may comprise a memory 224 coupled to radio processor 204. Memory 224 may be implemented using any type of memory described with reference to memory 208. Although memory 224 is shown as being separate from and external to radio processor 204 for purposes of illustration, in various embodiments some portion or the entire memory 224 may be included on the same integrated circuit as radio processor 204. Further, host processor 202 and radio processor 204 may share a single memory.

Device 100 may comprise a SIM 226 coupled to radio processor 204. SIM 226 may comprise, for example, a removable or non-removable smart card configured to encrypt voice and data transmissions and to store user-specific data for allowing a voice or data communications network to identify and authenticate the user. SIM 126 also may store data such as personal settings specific to the user.

Device 100 may comprise an I/O interface 228 coupled to the radio processor 204. I/O interface 228 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more position determination techniques including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFTL") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

In various embodiments, device 100 may comprise dedicated hardware circuits or structures, or a combination of dedicated hardware and associated software, to support position determination. For example, transceiver 220 and antenna system 130 may comprise GPS receiver or transceiver hardware and one or more associated antennas coupled to radio processor 204 to support position determination.

Host processor 202 may comprise and/or implement at least one location-based service ("LBS") application. In general, the LBS application may comprise any type of client application executed by host processor 202, such as a GPS application configured to communicate position requests (e.g., requests for position fixes) and position responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest ("POI") such as restaurants, hotels, landmarks, and entertainment venues, and other types of LBS services in accordance with the described embodiments.

Radio processor 204 may be configured to generate a position fix by configuring a position engine and requesting a position fix. For example, a position engine interface on radio processor 204 may set configuration parameters that control the position determination process. Examples of configuration parameters may include, without limitation, location determination mode (e.g., standalone, Mobile Station-assisted, Mobile Station-based), actual or estimated number of position fixes (e.g., single position fix, series of position fixes, request position assist data without a position fix), time interval between position fixes, Quality of Service ("QoS") values, optimization parameters (e.g., optimized for speed, accuracy, or payload), Position Determination Entity address (e.g., IP address and port number of LPS or MPC), etc. In one embodiment, the position engine may be implemented as a QUALCOMM® gpsOne® engine.

Figure 3:
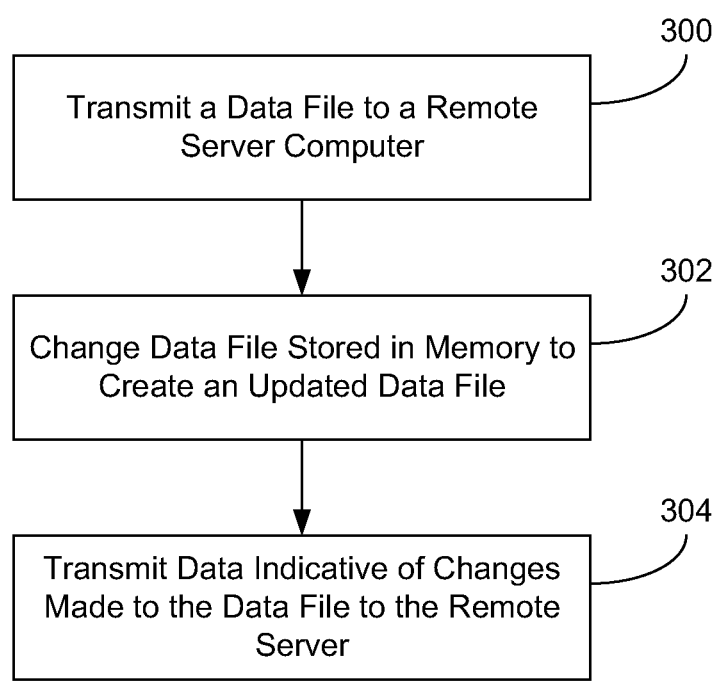
FIG. 3 is a block diagram of a method of backing up data from a mobile computing device, according to an exemplary embodiment.

Referring now to FIG. 3, an exemplary system and method for backing up data from a mobile computing device will be described. The steps of FIG. 3 may be operable by one or more modules of a mobile computing device 100 having one or more data files to be backed up. The data file may be any block of data or resource for storing data. In a simple form, the data file may be a sequence of binary digits. The data file may comprise one or more data records or lines, which may be individually different but share a common characteristic. The data file may be a text file, an image file, an executable file, a database file, or other file type.

According to one exemplary embodiment, the data file has a database file type and comprises a database of user data stored on mobile computing device 100. The user data may comprise one or more of contacts stored by a contacts application (e.g., whether local to device 100 or operable from a website such as an account on www.gmail.com). calendar appointments stored by a calendar application, internet resource locators or "web favorites" stored by a web browser application, data from other personal information management (PIM) applications such as a notes application or memo application, downloaded user data such as stock quotes and weather data, data from a social networking web site or application (e.g., www.facebook.com, www.linkedin.com, etc.), data stored from an application downloaded after manufacture to device 100 (e.g., a game, an image editing program, etc.), or other user data. Other data files may also be backed up, either as part of the database of user data or as separate files, such as word processing files, spreadsheet files, portable document format (.pdf) files, etc. The database may comprise any data that can be stored in a database format, such as a relational database, such as a relational database that can be queried using a structured query language (SQL) and/or created using a software library which implements a SQL database engine, such as SQLite. The database filename may comprise a database extension, such as .db3. Any data which is not backed up using one or more of the methods described herein may be backed up using other backup methods in some embodiments.

Device 100 may be configured to store the data file in memory 208 and/or 224, for example as firmware. Device 100 may further be configured to operate a data backup application configured to perform functions relating to backup of the data file to a backup storage device (e.g., server 232, which would include any memory or storage used by server 232, a digital versatile disc, a portable external hard drive, etc.). For example, the data backup application may be configured to receive user inputs indicative of backup preferences, such as which backup method to implement on which data files. Backup methods may comprise any of a number of backup methods, such as a full plus incremental backup in which device 100 is configured to first transmit a full backup of substantially all of the data file or files to the backup storage device, after which subsequent backup operations transmit update data files (e.g., comprising one or more entire records of a data file, a data block of a data file, or other data) indicative of changes in the data file since the immediately prior backup transmission, whether full or incremental. For a restore operation, this method requires downloading the full backup file along with all of the incremental backup files to restore the data file.

The backup method may be a full plus differential backup in which, after a full backup of the data file, subsequent backup operations transmit update data files indicative of changes in the data file since the last full data backup. For a restore operation, this method requires downloading the full backup file along with the last downloaded differential backup file to restore the data file.

Other backup methods may be a simple file copy, or backing up or logging every change to the data file, so that the user can return in a "time machine" fashion to an earlier point in operation of the device.

Other user inputs to the backup application may be indicative of which of certain data files or folders of files to backup or to not backup, the time of day and other information regarding the period, frequency, or predetermined time of backups, the desired backup storage device, username and/or password data, and/or other user inputs. For example, the backup application may be configured to backup data once per day, less than three times per day, etc.

As shown at step 300, device 100 may be configured to transmit a data file to server 232. The data file may comprise substantially all of the data in the data file as stored on device 100, which may be compressed or uncompressed, encrypted or unencrypted, or otherwise processed prior to transmission. Server 232 operations will be described in greater detail with reference to FIGS. 4 and 5 below. Device 100 may then be configured to receive and store changes or updates to the data file (step 302), such as data additions, data deletions, data edits, etc., made to data blocks, records or other portions of the data file. The changes or updates may be received from a user typing in the update, from an application making a change based on certain predetermined conditions, by synchronization operations with other computers via wired or wireless communications, or by other methods of receiving updated or changed data. Device 100 is configured to change or update the data file to create a changed or updated data file. Device 100 may further be configured to store an indication that a change or update has occurred to the data file.

At a predetermined time, for example as set by a user, manufacturer, or wireless carrier associated with device 100, device 100 is configured to determine whether a change or update has occurred since a previous backup transmission or operation (e.g., whether a full backup transmission, update data transmission, etc.) and, if so, to transmit data indicative of the changes made to the data file to server 232. The data indicative of the changes may comprise indications of one or more of data added, data deleted, new data records, etc. since a previous backup of the data file to server 232. The data indicative of the changes may be the data changes in any format, data files comprising the changes, compressed and/or encrypted data indicative of the changes, data converted to another format based on the changes, or other data indicative of the changes. The predetermined time may be periodic, and may be set and/or stored by a scheduler module, which may be part of a backup application operable on device 100. For example, the predetermined time may be midnight, after 10 PM, before 6 AM, etc. Device 100 may be configured to determine whether a change or update has occurred by checking a change indication bit or byte stored in memory (e.g., non-volatile memory), by checking a version number of a data file, or by another process. If a change has occurred, device 100 is configured to extract the changes or update data (e.g., substantially all of the changes made, a portion of the changes made, etc.) from the data file, compress the update data to form a compressed file of update data, and transmit the update data in the form of a compressed file to server 232 (step 304) using the wireless transceiver. Compression may be done using a ZIP compression or other compression algorithm. In one example, each record of the update data is exported in a JSON parsed format and serialized into an XML, which is then passed through a GZIP stream for compression. JSON is a JavaScript Object Notation, which is a text-based, human readable format for representing data structures and associative arrays. GZIP is an application for compressing a file, short for GNU zip. The compressed data is then sent to server 232.

The transmitted data is indicative of changes made to the data file on device 100, and may be in any of a plurality of forms, such as the updated data blocks or records themselves (e.g., only data blocks or records within the data file which have been updated or changed since a previous backup transmission), a compressed form of the updated data blocks or records, encrypted, converted to a database file format, or otherwise processed. The update data transmission may comprise an incremental, data file, a differential data file, a delta data file, etc. to indicate changes made to the data file on device 100. The preceding steps may be repeated serially or in parallel for different data files to be backed up (e.g. one or more databases of user data, data files for other applications, etc.).

Figure 3A:
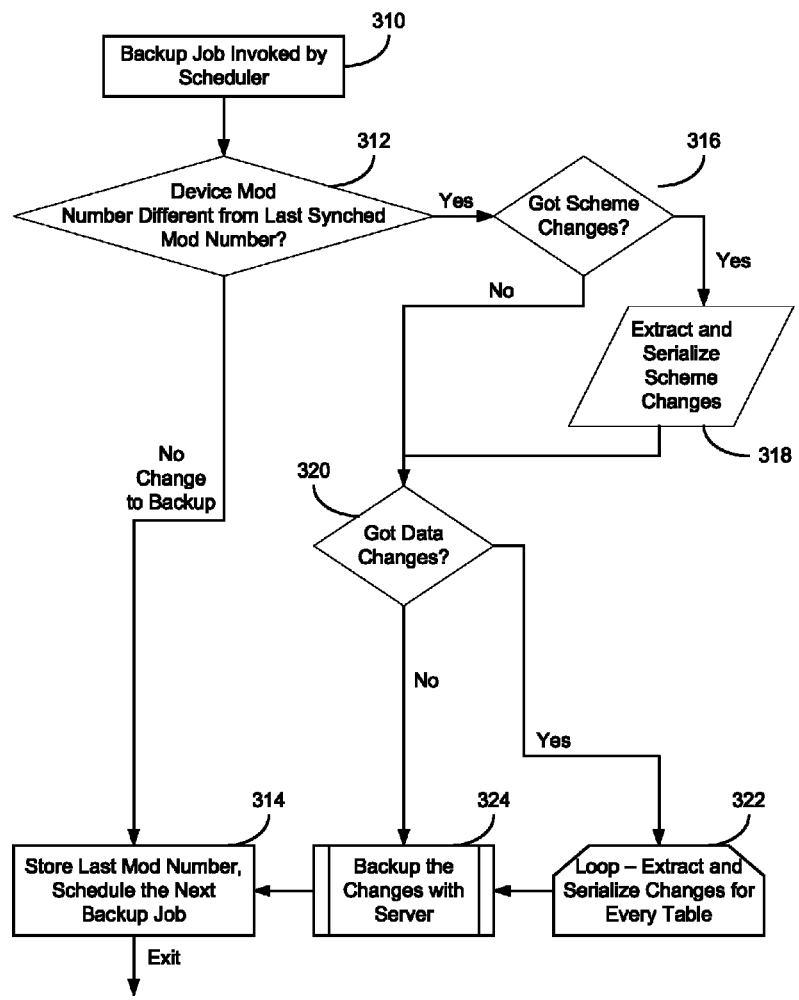
FIG. 3A is a flowchart of a method of extracting changes from a database, according to an exemplary embodiment.

Referring now to FIG. 3A, a more detailed flowchart for extracting data changes from a data file or database will be described, according to an exemplary embodiment. Processing circuit 201 may be configured to perform one or more of the steps described in FIG. 3A by way of an algorithm, program, or other code operable on processing circuit 201. At step 310, a backup process or job is invoked or initiated by the scheduler module. At step 312, a current modification number (which may be similar to a version number of a file) of the device's database of user data is compared to a modification number stored during a previous backup or synchronization operation and, if the same, no modifications have been made, so the process proceeds to step 314. The modification number may be stored within the database as a persistent column. The modification number may be incremented upon a first change to the data or schema of the database file since a previous backup operation. At step 314, the last modification number is stored and the next backup job is scheduled.

If the device modification number has changed at step 312, at step 316, the process determines whether there are any schema changes to the database file (e.g., new tables, reorganization of tables, new or changed file system, etc.). To identify any changes to the schema, a listener or observer object (which may be operated within a media application) may be configured to monitor edits to the database and identify any file changes. Alternatively, a metadata snapshot of the file system of the database may be stored and compared to snapshots of the metadata associated with subsequent modification numbers. If there are schema changes, the schema changes are extracted and serialized for backup. At step 320, if there are no more schema changes to be extracted, the process determines whether there are any changes to data within the database. If so, at step 322, the process extracts and serializes changes for every table within the database having changes. At step 324, any schema changes and/or data changes are backed-up to the server. The process then proceeds to step 314 to store the modification number associated with the version of the data which has now been backed-up. The next backup job is scheduled, and the process then returns to other processing.

Figure 4:
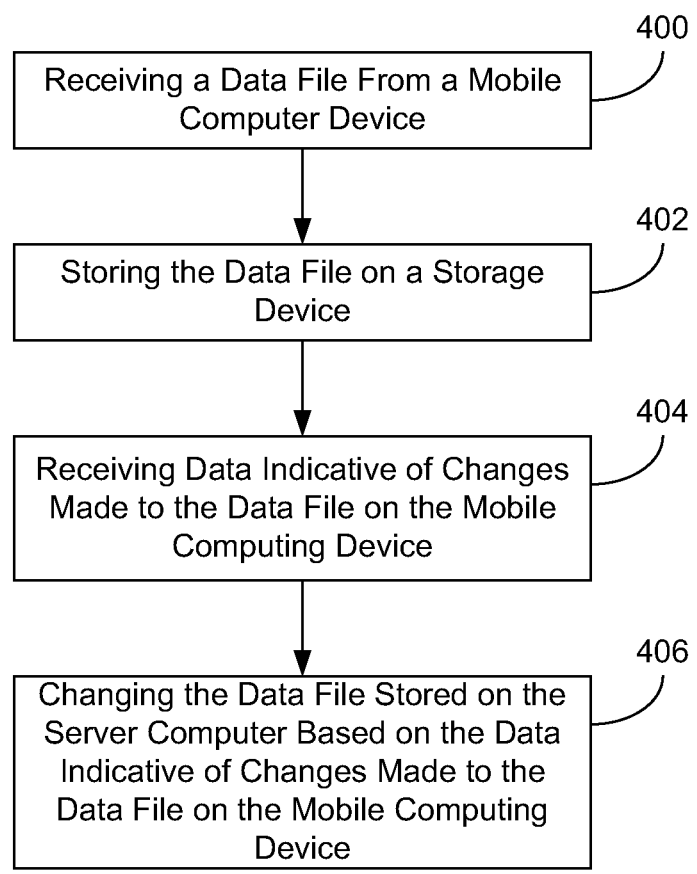
FIG. 4 is a block diagram of a method of backing up data from a mobile computing device, according to an exemplary embodiment.

Referring now to FIG. 4, an exemplary system and method for backing up data from a mobile computing device will be described. The steps of FIG. 4 may be operable by one or more modules of server 232, which may be operated by one or more entities. For example, one or more modules may be operated by a wireless service carrier associated with device 100, while other modules may operated by a manufacturer of device 100, while other modules may be operated by other third parties. Server 232 may be configured to receive a data file from device 100 (step 400). A receiving module on server 232 may be configured to authenticate the transmission, identify an account associated with the transmission based on data within the transmission (e.g., username, password, etc.), decrypt data within the transmission, and/or apply other processing steps. Server 232 may be configured to lookup a desired backup storage device or location based on a user preference stored along with a user account on server 232. Server 232 may be configured to store the data file in the backup storage device (step 402). The data file may be a full copy or of the data file or whole data file.

Server 232 is configured to receive data indicative of changes made to the data file on the mobile computing device (step 404) as described hereinabove. Server 232 may be configured to inflate or uncompress the data if it has been compressed by device 100, decrypt the data if it has been encrypted, and/or provide other processing steps on the data, as shown in greater detail in FIG. 4A below.

Server 232 is configured to change the data file stored in step 402 by server 232 (which, as described, may be stored in any of a number of different storage devices associated with or part of server 232) based on the data indicative of changes made to the data file on device 100 (step 406). Server 232 stores the changed, updated data file based on the data file stored in step 402 as changed by the update data received in the transmission or message in step 404. Server 232 may then be configured to delete some or all of the update data received in step 404 to conserve storage space on the storage device.

Server 232 may be configured to change the data file stored by server 232 in any of a number of ways. For example, server 232 may be configured to change the data file such that the data file stored by server 232 is substantially identical or compatible at a binary level to the data file stored on the mobile computing device from which the data file and data indicative of changes was determined. After the change to the data file is stored by server 232, the data files on device 100 and server 232 may be the same, substantially the same, substantially the same at a binary or bit level, have the same file type or extension, such as a database file format, comprise substantially the same content, and/or otherwise both represent or incorporate the data indicative of changes made to the data file on device 100. Server 232 may be configured to apply the update data to the data file stored on server 232 to create an updated or changed data file stored by server 232. The data files stored on device 100 and server 232 may comprise compressed data including or indicative of changes made to user data using a plurality of different applications (e.g., calendar, contacts, e-mails, etc.)

Figure 4A:
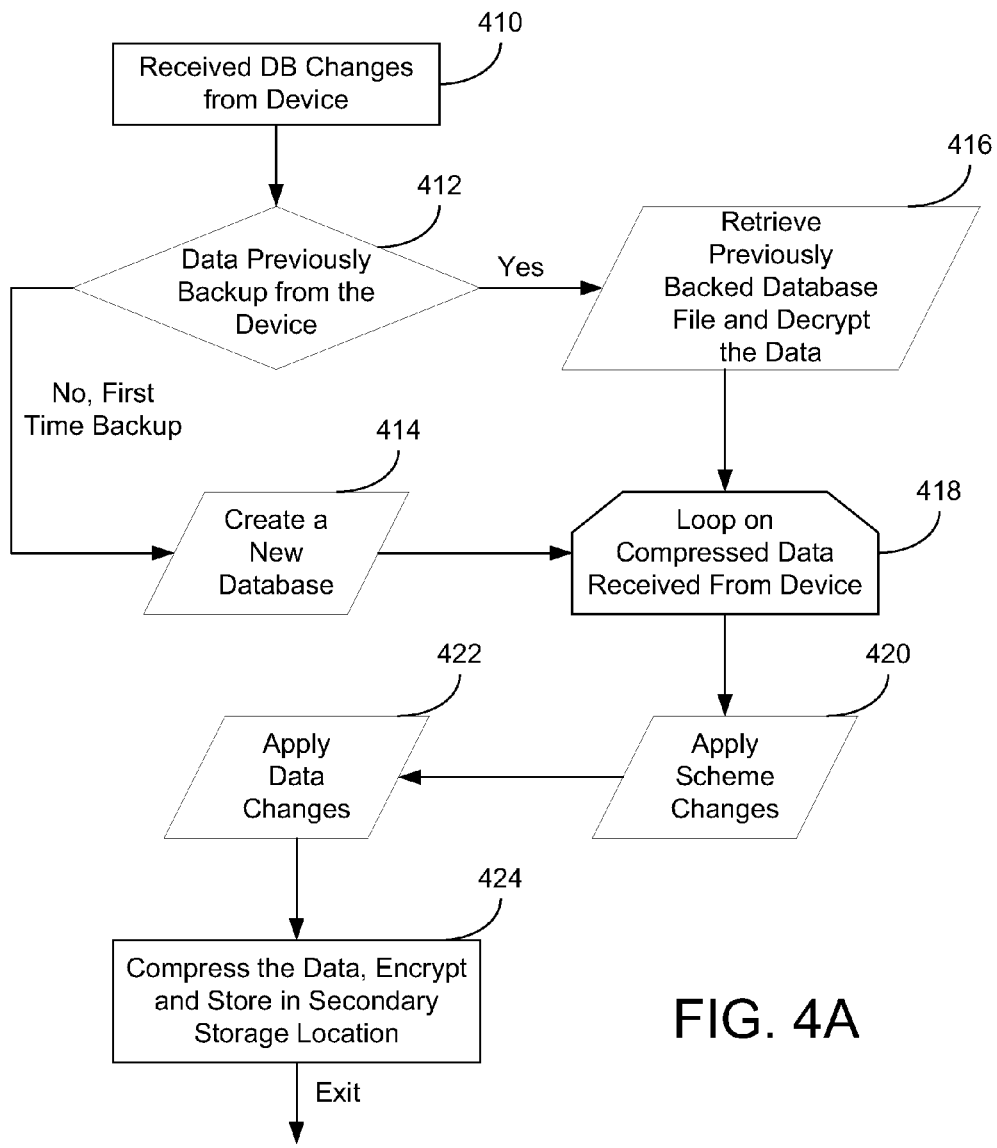
FIG. 4A is a flowchart of a method of backing up data from a mobile computing device, according to an exemplary embodiment.

Referring now to FIG. 4A, a method of backing up data from device 100 will be described, according to an exemplary embodiment. Server 232 may be configured to perform one or more of the steps described in FIG. 4A by way of an algorithm, program, or other code operable on a processing circuit associated therewith. At step 410, data indicative of changes to the data file on device 100 is received from device 100 by server 232. At step 412, if the data file has not previously been backed up from this mobile computing device, at step 414, a new data file or database is created. If the data file has previously been backed up from this device, at step 416, the previously backed-up database file is retrieved from memory and decrypted. At step 418, for each data file received from device 100, any schema changes are applied to the database stored by server 232 (step 420) and any data changes are applied (step 422), for example using a DML (Data Manipulation Language, such as SQL) to retrieve, insert, delete and update data in the database. At step 424, the updated data files or databases are compressed, encrypted and stored in a storage location, which may be on server 232 or part of another device.

According to one embodiment, server 232 is configured to maintain an updated copy of the data file based on the update data received from device 100 such that a duplicate copy of the data file on device 100 is created and stored on the storage device associated with server 232. Advantageously, during a subsequent restore operation of the data file to device 100 or a different mobile computing device, server 232 is configured to download the updated data file, without the need to also download incremental or differential data files, because the updated data file already represents any data updates from backup transmissions.

According to one exemplary scenario, a user wishes to add user data from a web-based account to a mobile computing device. The user synchronizes the device with the web-based account through a wireless network to a server operating the account. The synchronization step downloads 100 contacts, 100 calendar entries and 100 memos and stores them in a user data database on the device for use by contacts, calendar and memo applications, respectively, on the device. The device backs up the database at a predetermined time or in response to a user request to a backup server by transmitting the database to the server, which stores the database in a storage device. The next day, the user adds five contacts, deletes three calendar entries, and modifies five memos. At midnight that night, the device establishes communication with the backup server, takes the fifteen records which have been edited and sends them to the server. The server applies the changes to its copy of the database. The server now has a copy of the same database file that the device has. If the user has also installed a new application, the application files may also be backed up to the server before, during or after the backup of the database of user data. If the application stores data in the database, those changes may be backed up as with the contacts, calendar entries and memos described above. If a user changes data associated with the application (e.g., metadata, user interface preferences, etc.), these changes may be extracted in a similar manner to the contacts, calendar entries and memos and backed up to a copy of the application files stored by the server.

Figure 5:
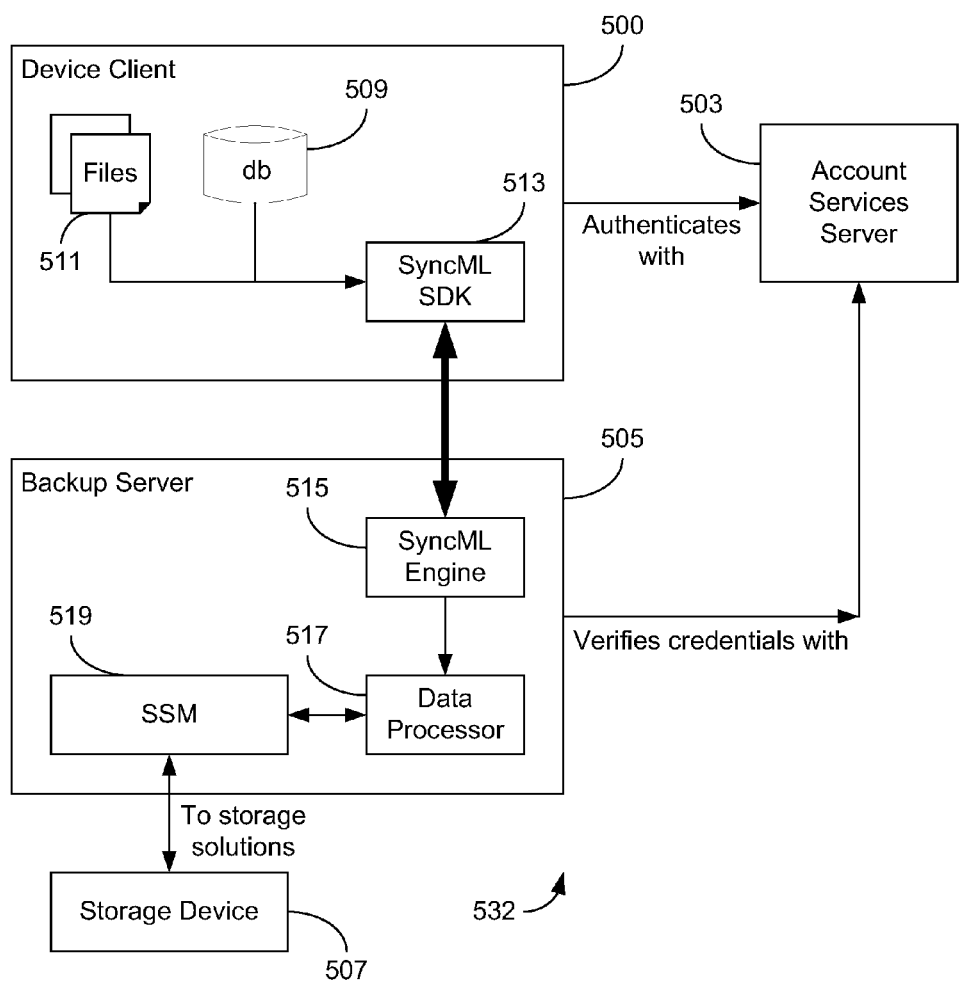
FIG. 5 is a block diagram of a system and method of backing up data from a mobile computing device, according to an exemplary embodiment.

Referring now to FIG. 5, a block diagram of a backup and restore system will be described. Portions of the block diagram of FIG. 5 may be implemented using one or more of the methods and devices described above. The system comprises a device 500 and a server 532 comprising an account services server 503, a backup server 505, and a storage device 507. Servers 503 and 505 and storage device 507 may be separate computing devices or modules of a single computing device, or each may comprise multiple computing devices in various embodiments. Device 500 is configured to store data files, comprising a database 509 of user data and other data files 511. Device 500 is configured to extract changes made to the data files and to provide data indicative of the changes to a communication module 513. Storage device 507 may comprise a local memory on server 505, a separate storage device over a network connection from server 505, a third party online storage service such as Amazon S3 (Simple Storage Service) provided by Amazon Web Services of Amazon.com, Inc., Seattle, Wash., etc., and may be remote from the device 100 (e.g., at a server location, separated from device 100 by a wireless connection, etc.). Storage device 507 may be operated by a manufacturer of device 500 or by another party.

Communication module 513 may be configured to communicate with a communication module 515 on server 532 (and/or a communication module on server 503) using any of the communication methods described herein (e.g., cellular, IEEE 802.11x, etc.). Modules 513 and 515 may be synchronization modules configured to facilitate synchronization of data between device 500 and server 505. More specifically, modules 513 and 515 may be configured to communicate using a markup language, such as a SyncML (Synchronization Markup Language) standard. Modules 513 and 515 may be configured to synchronize data from applications (e.g., contacts, calendar, e-mail, tex messages, push e-mail, etc.) and may further be used for backup and/or restore operations such as those described herein. Advantageously, modules 513 and 515 may be configured, in response to an interruption in a synchronization of a file, to cease synchronization and/or resume synchronization without starting at the beginning of the file being synchronized. For example, synchronization after an interruption may resume substantially at the point in the file where the interruption occurred. The interruption may be caused by a loss of a communication signal, another process (e.g., a phone call) using the communication signal used for synchronization, etc.

Module 513 may be configured to communicate with servers 503 and 505 using an OMA-DM (Open Mobile Alliance for Device Management) or OMA-DS (Open Mobil Alliance for Device Synchronization) communication or synchronization protocol. OMA-DM and OMA-DS protocols may use a markup language, such as XML (Extensible Markup Language), or a SyncML markup language. These protocols may use any data transport layer, such as a wired layer (e.g., USB, RS-232, etc.) or wireless layer (GSM, CDMA, IrDA, Bluetooth, etc.), and may be implemented over any of a wireless application protocol (WAP), HTTP, Object Exchange (OBEX), or other transports. These protocols may use a request-response message exchange method in which a requester sends a request message to a replier system which receives and replies to the request with a response message. These protocols may use authentication and/or security on server side 505 and/or device side 500 (e.g., which may be a mutual authentication) to identify the senders of each message. These protocols may initiate a communication session from a server, which may occur asynchronously, and may use WAP push, SMS, or other messaging systems. These protocols may initiate a communication with a notification or alert message from server 505 to device 500 (or vice-versa) to notify the other of a desire to establish a communication session. These protocols may be configured to enable communications among more than two devices. While this exemplary embodiment is described with reference to OMA-DM and OMA-DS protocols, other protocols (e.g., using a Transmission Control Protocol (TCP) or other protocol) having one or more of the characteristics described above or other characteristics may be used.

According to one exemplary embodiment, device 500 may configured as a master to one or more devices on the server side, such as backup server 505. Module 513 and module 515 may be configured in a manner that module 513 wins (e.g., a "client win" configuration) any discrepancy in synchronized data between device 500 and server 515. According to another exemplary embodiment, communications described herein may transfer binary data using an extension of an OMA protocol that generically supports any data type rather than an extension configured to handle a certain specific data type.

In response to a request message from device 500 to server 503, server 503 is configured to authenticate the request message and identify a user account associated with device 500 before changing the data file stored on storage device 507. Server 503 may be configured to establish an account, receive a user request for a backup service, process payment, etc. Server 503 may further be configured to communicate with backup server 505.

Figure 5A:
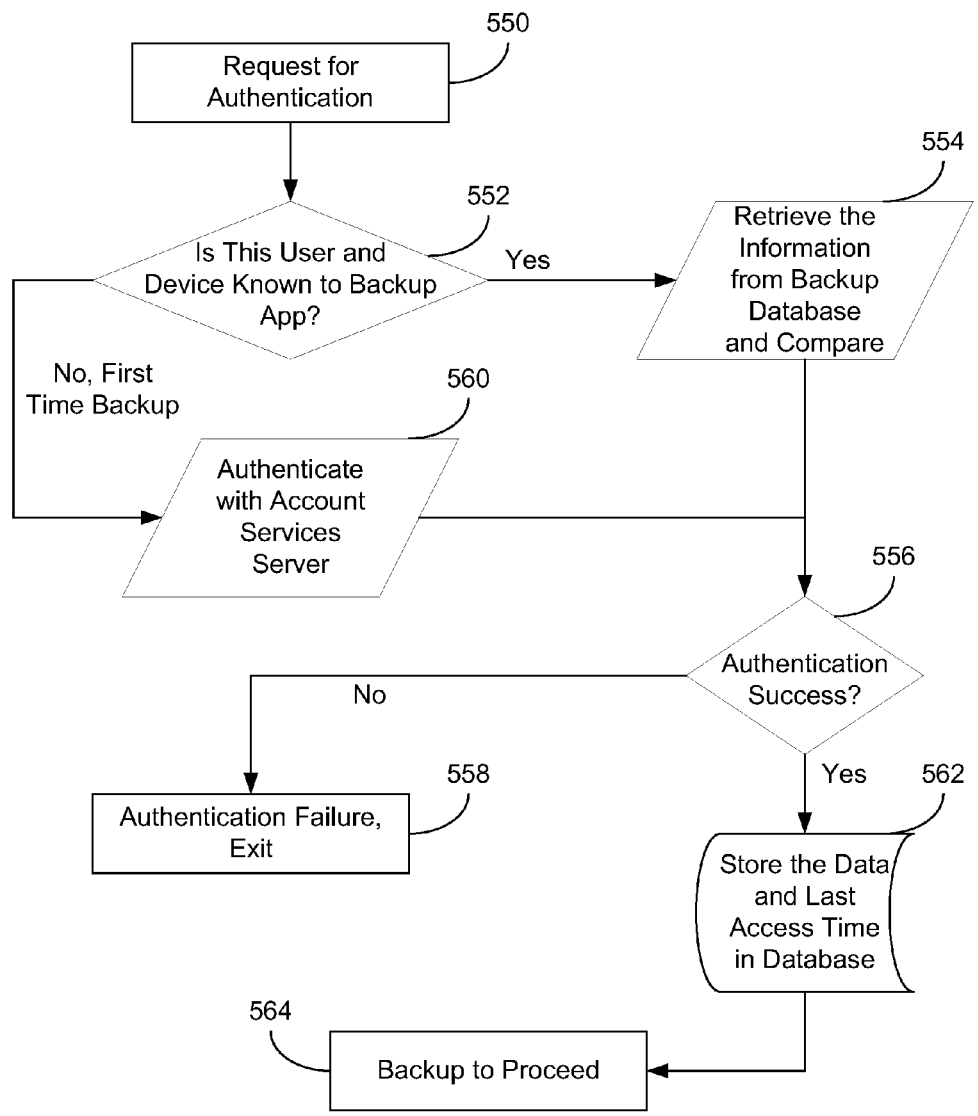
FIG. 5A is a flowchart of a method of authenticating a device, according to an exemplary embodiment.

Referring to FIG. 5A, a flowchart of a method of authentication is described, according to an exemplary embodiment. Device 100, account services server 503, and/or backup server 505 may be configured to perform one or more of the steps described in FIG. 5A by way of an algorithm, program, or other code operable on processing circuits associated therewith. Authentication may be carried out using an OMA-DS authentication process. At step 550, device 500 sends a request for authentication to backup server 505. At step 552, if device 500 is known to backup server 505, the process proceeds to step 554, at which step information from the backed-up database is retrieved and compared to credentials of device 500. If the credentials match, authentication is a success (step 556). If the credentials do not match, authentication is a failure (step 558) and backup does not proceed.

At step 552, if the user or device are not known to backup server 505, this is a first time backup for user and/or device 500, and the process proceeds to step 560 at which backup server 505 authenticates using an account services server 503. Device 500 must have previously registered an identity or account with account services server 503 for server 503 to be able to verify credentials in step 560 (which may come from backup server 505 after server 505 determines this is a first time backup). After step 560, if backup server 505 succeeds in verifying the credentials of device 500 with account services server 503, at step 556, an authentication success is determined, and processing proceeds to step 562.

At step 562, if authentication is a success, server 505 stores the user data and last access time in a database for subsequent compare steps (i.e. subsequent steps 552 and/or 554) and proceeds with backup operations 564 as described herein.

During a backup operation, module 513 is configured at the predetermined period (e.g., once per day, etc.) to query database 509 and/or files 511 to determine whether any changes have been made to the data stored therein. If data has been changed, module 513 is configured to establish a communication session with module 515 as described above. Module 513 is then configured to extract the changes from database 509 and/or files 511, compress the complete file (if a first or full backup) or data indicative of changes (if a subsequent update backup operation), and transmit the data files and/or data indicative of changes to the data files to module 515.

Module 515, under control of a processor or data processor 517, is configured to receive the backup data from module 513 and identify any full data files corresponding to received data indicative of updates. Any corresponding full data file is retrieved from storage device 507 and decrypted and decompressed at a storage services module 519 so that it may be edited. Data processor 517 is then configured to receive the data indicative of changes from module 515, decompress the data, and apply the data indicative of changes to the full data file. The updated or changed data file is then compressed and encrypted by module 519 and returned to storage device 507.

After updating, module 515 is configured to send a message to module 513 indicating that updating has been completed. In response to this or based on other circumstances, device 500 is configured to mark or identify a point in time indicating when or which data has been backed up and/or applied to the data file stored on the server side (e.g., in storage device 507). At the next predetermined backup time, device 500 is configured to read the mark or identification and determine which changes to process for the next backup operation based on the mark or identification.

As mentioned, during a subsequent restore operation of the data file to the device or a different mobile computing device, server may be configured to download the updated data file, without the need to also download incremental or differential data files, because the updated data file already represents any data updates from backup transmissions. Any of a plurality of restore operations may be used. For example, server 505 may be configured to receive a request to download data to device 500 or to a second mobile computing device (for example, if a user replaces their device with a new device, if a user uses two or more devices, etc.). In response to the request, server 505 may be configured to transmit the changed data file to device 500 or the second mobile computing device. According to one embodiment, the transmission is of the changed data file (e.g., the substantially full or complete updated or changed data file) without sending individual incremental data files. A restore operation described in U.S. patent application Ser. No. 12/134,156 entitled "Restoring of Data to Mobile Computing Device" filed concurrently herewith, which is herein incorporated by reference in its entirety, may be used to restore data backed up using one or more of the embodiments described herein.

The backup embodiments disclosed herein may be combined with other backup operations for other data on device 100. For example, a database of user data may be backed up using the systems and methods described herein, while other data (e.g., ringtones, downloaded applications, stored data associated with applications downloaded from parties other than the manufacturer of device 100, state of operation of one or more applications, etc.) may be backed up using other backup methods. In this manner, a device may be restored to full or near full functionality as compared to the device's functionality prior to the last backup operation.

The embodiments disclosed herein have been described with reference to block diagrams and flow diagrams. Each block may represent one or more computer programs (e.g., software, firmware, etc.) and/or the hardware or processing circuitry on which the computer programs operate (e.g., microprocessors, microcontrollers, applications-specific integrated circuits, programmable logic, programmable gate array, etc.). Use of the term module herein may refer to either computer program and/or circuit components operating the computer program to carry out the functions described herein. Modules may interface with other modules at a hardware and/or computer program level, and may operate at and/or interface with other modules at any applicable computer program level specified in the Open Systems Interconnection (OSI) model, such as application layer, presentation layer, session layer, transport layer, network layer, data link, physical layer, etc. Modules may be represented by a block, multiple blocks or portions of blocks in the various figures herein.

While the exemplary embodiments illustrated in the Figures, and described above are presently exemplary, it should be understood that these embodiments are offered by way of example only. Accordingly, the present invention is not limited to a particular embodiment, but extends to various modifications that nevertheless fall within the scope of the appended claims.

What is claimed is:

1. A method of backing up a first file stored on a mobile computing device, comprising:
  receiving, at a server computer, a first data based on the first file;
  storing a second file based on the first data on a storage device remote from the mobile computing device, the storage device corresponding to a predetermined particular backup location, wherein the first file and the second file have a same database file format, such that the second file stored is substantially identical at a binary level to the first file;
  receiving, at the server computer, second data indicative of changes made to the first file, wherein the second data comprises indications of changes to the first file since a previous backup of the first file, the changes including data added or data deleted, the previous backup being associated with a previous modification number, wherein the indications of data changed in the first file since a previous backup comprises a new modification number associated with the changes made to the first file;

determining that the new modification number is different from the previous modification number;

upon determining that the new modification number is different from the previous modification number, changing the second file based on the data indicative of changes made to the first file, wherein the changed second file is substantially identical at a binary level to and has a same database file format as the changed second file stored on the mobile computing device, wherein changing the second file comprises updating a schema of the second file; and in response to updating the schema, updating data of the changed second file.

2. The method of claim 1, wherein the first data and second data are received via wireless communication.

3. The method of claim 1, wherein the second data is received periodically.

4. The method of claim 1, wherein the second data is communicated via a synchronization protocol.

5. The method of claim 1, further comprising:
encrypting the second file.

6. The method of claim 1, wherein the first data file comprises user calendar data and the second data comprises at least one of an added calendar entry and a deleted calendar entry.

7. The method of claim 1, further comprising:
receiving a request to download data to the mobile computing device or a second mobile computing device; and
transmitting the changed second file to the mobile computing device or the second mobile computing device without sending incremental data.

8. The method of claim 7, wherein the changed second file received from the storage device is saved on the mobile computing device in the same database file format in which it was stored on the storage device.

9. The method of claim 1, further comprising:
in response to changing the second file, deleting at least some of the second data.

10. The method of claim 1, wherein the database file format of both the first file and the second file is a relational database file format.

11. The method of claim 10, wherein the database file format of both the first file and the second file is a structured query language format.

12. The method of claim 11, wherein the first file and the second file have a same file extension.

13. The method of claim 12, wherein the file extension is .db3.

14. The method of claim 1, further comprising:
storing application files received from the mobile computing device on the storage device.

15. The method of claim 1, wherein the first file and the first data are received from the mobile computing device at the server computer through a communications module configured to communicate using at least one of an Open Mobile Alliance for Device Management protocol or an Open Mobile Alliance for Device Synchronization protocol.

16. The method of claim 1, further comprising:
storing a third file received from the mobile computing device in a different format than the database file format.

17. A server, comprising:
a processor; and
one or more non-transitory computer-readable media having program code stored thereon, the program code being executable by the processor to implement:
a first program code module configured to receive a first data from a mobile computing device based on a first file,
a second program code module configured to store a second file based on the first data on a storage device, the storage device corresponding to a predetermined particular backup location, wherein the first file and the second file have a same database file format, such that the second file stored is substantially identical at a binary level to the first file,
a third program code module configured to receive second data indicative of changes made to the first file, wherein the second data comprises indications of changes to the first file since a previous backup of the first file, the changes including data added or data deleted, the previous backup being associated with a previous modification number, wherein the indications of data changed in the first file since a previous backup comprises a new modification number associated with the changes made to the first file,
a fourth program code module configured to determine that the new modification number is different from the previous modification number, and
a fifth program code module configured to change the second file based on the data indicative of changes made to the first file upon determining that the new modification number is different from the previous modification number, including updating a schema of the second file, and in response to updating the schema, updating data of the second file; and
wherein the changed second file is substantially identical at a binary level to and has a same database file format as the changed second file stored on the mobile computing device.

18. The server of claim 17, wherein the program code is executable by the processor to implement a sixth program code module configured to provide a user account for the mobile computing device and configured to authenticate a message from the mobile computing device before changing the second file stored on the storage device.

19. The server of claim 17, wherein the program code is executable by the processor to implement a seventh program code module configured to encrypt the changed second file stored in the storage device and to store the encrypted changed second file in the storage device.

* * * * *